E. FREY.
VARIABLE SPEED TRANSMISSION.
APPLICATION FILED DEC. 11, 1920.
1,431,647.
Patented Oct. 10, 1922.
2 SHEETS—SHEET 1.
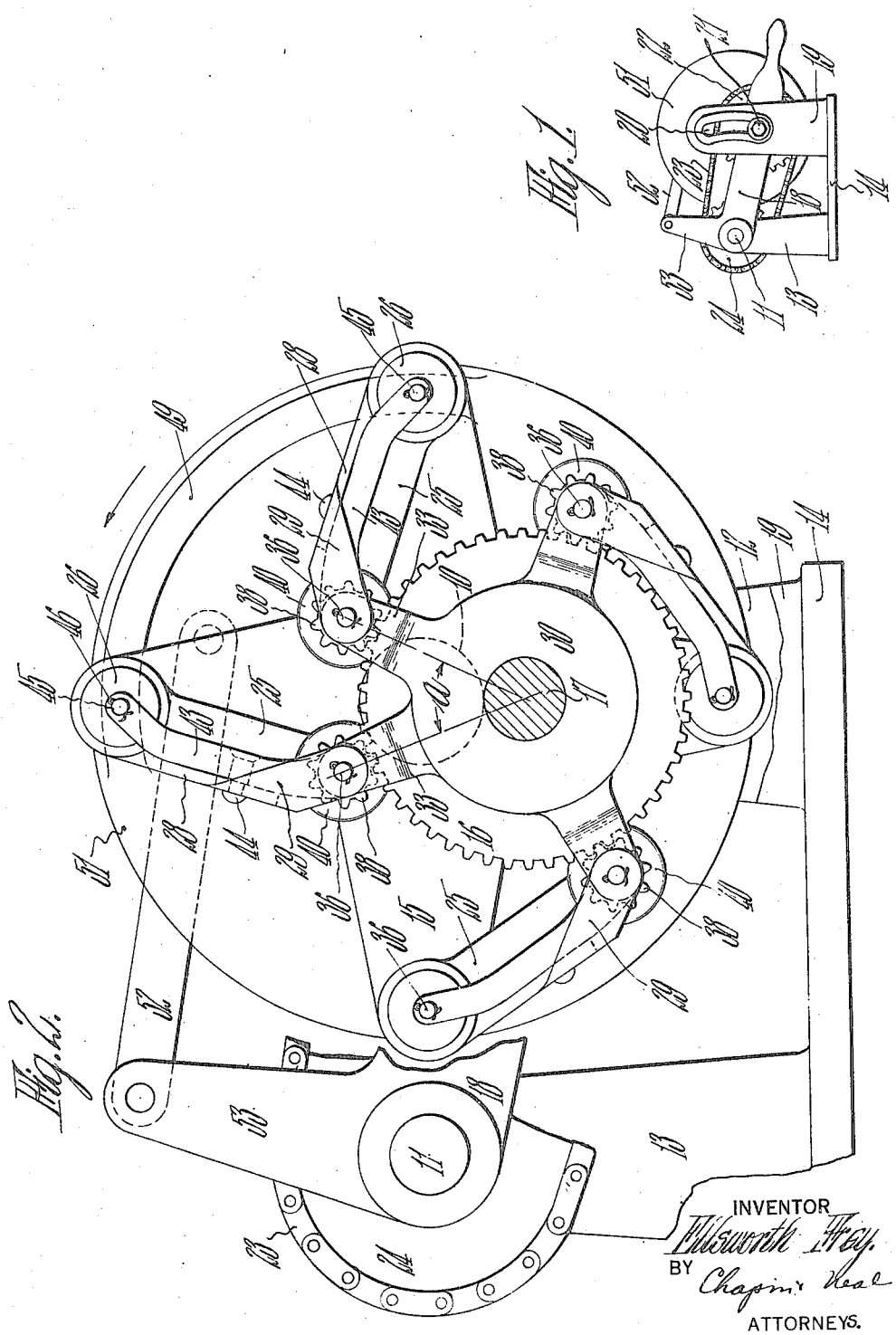
INVENTOR
Ellsworth Frey.
BY
ATTORNEYS.

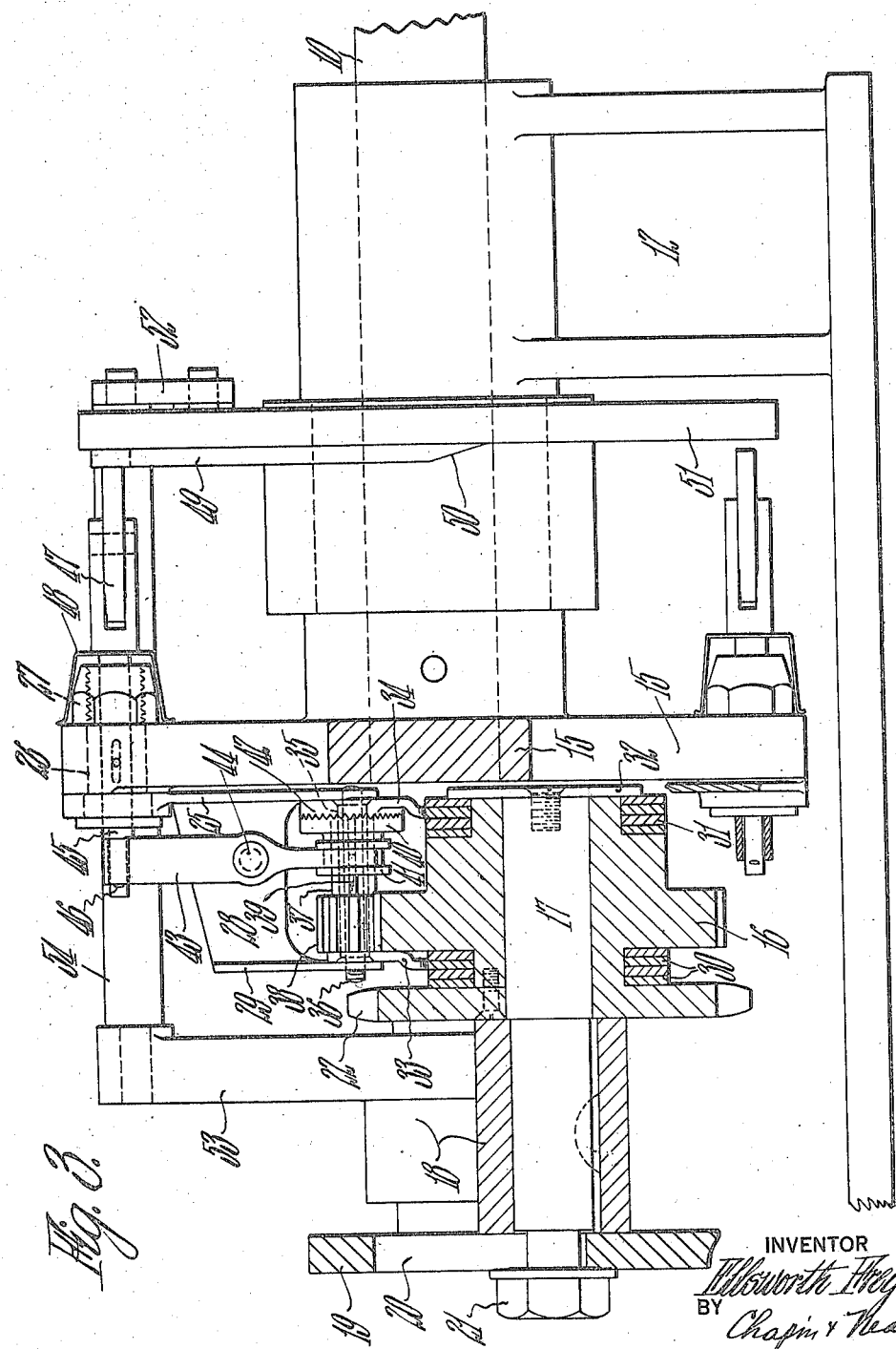

Patented Oct. 10, 1922.

1,431,647

UNITED STATES PATENT OFFICE.

ELLSWORTH FREY, OF SPRINGFIELD, MASSACHUSETTS, ASSIGNOR TO FREY VARIABLE SPEED GEAR COMPANY, OF HOLYOKE, MASSACHUSETTS, A CORPORATION OF MASSACHUSETTS.

VARIABLE-SPEED TRANSMISSION.

Application filed December 11, 1920. Serial No. 429,934.

*To all whom it may concern:*

Be it known that I, ELLSWORTH FREY, a citizen of the United States, residing at Springfield, in the county of Hampden and State of Massachusetts, have invented new and useful Improvements in Variable-Speed Transmissions, of which the following is a specification.

This invention relates to improvements in variable speed transmissions and, more particularly, to transmissions of the type wherein the driving and driven members are connected by positive, as distinguished from frictional, means. An example of a variable speed transmission, of the type referred to, is shown in my prior U. S. Letters Patent No. 1,263,546, granted April 23, 1918.

An object of this invention is to simplify and improve the variable speed transmission shown in my prior patent, and render it less expensive to manufacture.

Another object of the invention is to provide, in a transmission of the type described, positive means to successively lock the driving members in driving engagement with the toothed wheel with which they coact.

Another object of the invention is to provide in a transmission, wherein the driving and driven elements are displaceable in substantially a radial direction, a sun gear to constitute one of said elements, and a series of planetary gears constantly in mesh therewith, which gears are moved about the orbit of the sun gear by means connected with the other element, together with means for successively locking each planetary gear against rotation about its own axis so that said means is effective to drive the sun gear.

Another object is to provide improved means for connecting the driving and driven elements, including a part in constant engagement with each and means for periodically locking said parts together.

A further object is to provide in a transmission of the class described generally improved mechanical structure.

Other objects and advantages will appear in the following description and in the illustrative embodiment of the invention in the accompanying drawings, in which,—

Fig. 1 is a more or less conventional end elevational view of the transmission;

Fig. 2 is an enlarged end elevational view thereof, with certain parts shown in Fig. 1 broken away to more clearly disclose important parts of the mechanism; and Fig. 3 is a side elevational view, partly in section, of the transmission.

Referring to these drawings, the driving and driven shafts are indicated at 10 and 11, respectively, and these shafts are supported at one end by brackets 12 and 13, respectively, mounted on a suitable bed 14. The other ends of these shafts are supported by any suitable means, not shown. As shown, the driving and driven shafts are arranged in spaced parallel relation in order to permit the driven member to be displaced radially with relation to the driving member.

The latter, as shown, takes the form of a star wheel 15 fixed to the driving shaft 10. The driven member, as shown, consists of a gear 16, which is rotatably mounted on a stud 17, fixed in one end of a radius arm 18. The latter is pivotally supported by the driven shaft 11, and is movable closely adjacent a bracket 19 on bed 14. Bracket 19 is provided with a slot 20, curved concentrically with shaft 11, and a portion of stud 17 extends through this slot and is provided with a nut 21 by means of which arm 18 may be clamped to bracket 19 in any of the various positions which it may assume. The slot 20 is so arranged as to permit the stud 17 to be moved a substantial distance below or above shaft 10, or the stud 17 may be arranged substantially in alignment with the shaft. To the driven member 16 is fixed a sprocket 22, which is connected by a chain 23 to a sprocket 24 on the driven shaft 11. Thus, the driven member 16 is displaceable in opposite directions from a position of substantial alignment with the driving shaft 10 and is so displaceable without interrupting its driving connections with the driven shaft 11.

Power is transmitted from the driving member 15 to the driven member 16 by a series of arms 25, which are pivotally connected to the member 15 at angularly spaced points thereon and are arranged to successively drive the member 16 during a certain portion of the rotation of member 15. As shown, there are four such arms, arranged ninety degrees apart on the star wheel, and each arm is arranged to drive member 16 during substantially one quarter of a revolution of member 15. Actually, one arm 25 becomes effective to drive member 16 just prior to the time that the preceding arm is rendered ineffective for the purpose, so that there is never any interruption in the continuity of the movement of member 16. The number of driving arms 25 may be varied, as desired, and the provision of additional arms is advantageous in that any one arm need become effective for driving for a less interval in the rotation of member 15, which will improve the uniformity of movement of the driven member 16. Also, with a larger number of driving arms, the same interval of effectiveness may be retained, which will mean that two or more arms may be simultaneously effective for driving member 16.

Each arm 25 is mounted on a hollow stud 26 which extends through an arm of the star wheel 15 near its outer end and is clamped thereto by a nut 27. The arm 25 is held between the face of wheel 15 and the head of stud 26 to prevent axial displacement. Each arm is provided with an extension 28 at right angles thereto and such extension carries an ear 29 arranged parallel to but spaced from the arm.

Mounted to turn freely on the hub of gear 16 and held between a shoulder on the gear and the sprocket 22 are a series of discs 30, constituting carriers and corresponding in number to the number of driving arms 25. Similarly mounted on the opposite side of gear 16 is a similar series of discs 31, which are held between a shoulder on gear 16 and a flange 32 on stud 17. Flange 32 also cooperates with arm 18 to hold gear 16 and sprocket 22 against axial displacement on stud 17. Each disc 30 carries a radially projecting arm 33 and each disc 31 a similar arm 34. The outer end of each arm 33 is connected to an arm 34 by a hollow bushing 35, preferably secured, as by riveting, to the arms. Thus, each disc 30 is connected to a disc 31 to turn therewith. Each connected pair of discs forms a support for the outer end of each driving arm 25 and maintains such end always at a fixed distance from the center of the driven member 16. The connected arms 33 and 34 fit between the arm 25 and its ear 29 and are connected thereto by a pin 36 which passes through the bushing 35. Three of the four arms 33 and three of the four arms 34 are offset, as indicated in Figs. 2 and 3, to bring their ends into the desired relation with the arm 25 and ear 29. Freely rotatable upon the hollow bushing 35 and extending between the arms 33 and 34 is a hollow shaft 37 which carries a gear 38, preferably integral therewith. Slidable on shaft 37, but rotatable therewith by virtue of a key 39, is a clutch element 40 carrying a grooved clutch collar 41 and fixed on the arm 34 is a corresponding clutch element 42. Normally, the clutch elements are disengaged, thereby permitting gear 38 to rotate about its axis and roll about the periphery of gear 16 in the fashion of a planetary gear rolling about the sun gear. When the clutch elements are disengaged, the push or pull of arms 25 during rotation of star wheel 15 is ineffective to turn gear 16, but, on engagement of the clutch elements, gear 38 is locked against rotation about its axis, and therefore transmits the pull or push of arms 25 to the driven member 16.

For the purpose of shifting the movable clutch elements 40, an arm 43, having a forked end for actuating the grooved collar 41, is pivoted intermediate its ends at 44 to the described portion or extension 28 of each driving arm. The other end of arm 43 has a hole therein to loosely receive the necked-down end of a spindle 45, which is slidably mounted in the hollow stud 26, heretofore described. A pin 46 on one end of spindle 45 cooperates with a shoulder on the latter to hold the upper end of arm 43 against axial displacement relatively to the spindle. The other end of the latter is forked to receive a roll 47 and a spring 48 acts between the back of the star wheel 15 and the shoulder, afforded by the forked portion of the spindle, to move the latter rearwardly and thus hold the clutch element 40 away from its mating element 42.

For the purpose of engaging the clutch elements, a cam 49 is provided in the path of rolls 47. Cam 49 is curved concentrically about the axis of shaft 10 and has a dwell portion, the angular extent of which is substantially ninety degrees. At each end of this dwell portion are short inclined portions 50. The cam is fixed to a disc 51, the hub of which is mounted to turn freely on a reduced portion of the hub of bracket 12 and is held against axial displacement between the hub of star wheel 15 and a shoulder on bracket 12. A link 52 connects disc 51 to the upper end of an arm 53 which is fixed to, or integral with, the described radius arm 18. The arm 53 has a relatively long offset portion formed by a rod 54 (Fig. 3) to extend rearwardly a sufficient distance for connection to link 52. Thus, as the radius arm 18 is raised to vary the relative radial displacement of the driving and driven members, the cam 49 is automatically shifted for reasons which will later appear.

In operation, the star wheel 15 may rotate in either direction, as desired, and the nature of the connection between the driving arms 25 and driven member 16 is such that the latter may be driven either by a pushing or a pulling action of arms 25 thereon. The transmission is therefore arranged for forward or reverse drive. Preferably, the star wheel 15 rotates in the illustrated direction for forward drive and in the opposite direction for reverse drive and, although this is desired, on account of transmitting the power for the greater part of the time by pushing rather than pulling, it is not essential. The transmission is also reversible in another sense, viz., in that power may be applied to the shaft 11 and transmitted to the shaft 10. It is therefore not essential that the driving member 15 carry the driving arms 25 for the member 16 may equally well be used as a driving member and transmit power by the arms 25 to drive member 15. Thus, while in the foregoing description the driving member is considered as the member 15 and will for convenience be similarly considered in the following description of operation, I do not intend to limit myself in this respect.

Assuming that the parts occupy the relative positions shown in Fig. 2 and that shaft 10 is driven in the direction of the arrow, the upper arm 25 has practically completed its interval of driving of the member 16 and its gear 38, which has for the preceding ninety degrees of movement been locked against rotation by reason of the roll 47 riding on the dwell portion of cam 49, is about to be unlocked by such roll riding down the inclined end of the cam onto the face of disc 51, which will result in the disengagement of the mating clutch elements. The right hand arm 25 has, however, been moved into such position that its roll 47 has been carried up the other inclined end 50 of cam 49 onto the dwell portion thereof, which results in an engagement of the clutch elements and a locking of the gear 38 carried by this particular arm. Thus, one driving arm becomes effective before the preceding one has been rendered ineffective. The right hand arm will, during the next ninety degrees of movement, push gear 16 through a definite angle and then be rendered ineffective for driving purposes as a following arm comes into play.

Each arm 25 therefore becomes successfully active to drive the driven member 16 for a definite angular step and the angular movement imparted to member 16, by a given angular movement of the driving member 15, will vary according to the amount of relative radial displacement of their axes. With the parts as shown, a ninety degree movement of member 15 moves the driven member through a much smaller angle $a$ and therefore the speed of shaft 11 is slower than that of shaft 10. As the axis of gear 16 approaches the axis of shaft 10, the speed of the gear will increase progressively and, when these axes are aligned, the speed of the driving and driven members will become equal. As the axis of gear 16 moves above that of member 15, the speed of the gear becomes greater than that of the driving member and progressively increases as the axis of gear 16 moves farther away from that of member 15. Thus, the transmission is arranged to step the speed up or down and by as small increments as are desired. Furthermore, variation of speed may be accomplished while the transmission is in operation without interruption of the constant positive driving connection between the driving and driven members.

As each arm 25 is rendered ineffective to drive gear 16, its gear 38, becoming free to rotate on its axis, rolls around the periphery of gear 16 and always remains in mesh. As the arms travel away from the position in which their gears 38 are released, these gears roll faster and faster until they arrive at the bottom of gear 16 and thereafter they roll slower and slower, and finally come practically to rest at the time that the clutch elements are again engaged. This feature is important in that the clutch elements can be engaged without the jerk and jar incident to their engagement when moving relatively to one another at high speed. The fact that gear 38 at such time does come to rest, or substantially so, so far as rotation about its axis is concerned, will be apparent when it is considered that its arm 25 is then moving at substantially the same speed as the arm ahead of it which is driving the gear 16 and substantially at the same speed as the peripheral speed of the gear.

In changing speed, by raising the axis of gear 16 from the illustrated position, it has been found desirable to also shift the cam 49, which controls the times when the driving arms are rendered effective and ineffective to drive gear 16. This shifting of cam 49 is made to accomplish, as nearly as possible, a locking of the gear 38 of each arm at a time when such gear ceases rotation about its own axis and therefore at a time when its driving arm is moving at the same speed as that driving arm, which is located ahead of it and is about to be uncoupled. For example, if gear 16 is raised without shifting cam 49, it will be found that one of the two arms, whose gears 38 are locked, will move faster than the other and binding of parts results. If, however, the cam 49 is shifted in the direction of the arrow, a position will be found wherein the two arms 25 will be moving at substantially equal speed, so that it is possible to have them simultaneously coupled to gear 16 without binding action. Therefore, the cam 49 is arranged to be shifted automatically on movement of arm 18.

An important advantage incident to the use of the particular means chosen for coupling the driving arms to the driven gear is that the possibility of slipping of the arms between the time when they are supposed to become effective to drive gear 16 and the time when they actually become thus effective, is reduced to a minimum. For example, imagine that the arms 25 were like pawls and directly engaged in the teeth of gear 16. Then, unless the pawl end exactly aligned with the tooth space, it would not immediately drop in, but would move idly forward until it could so drop. This would result in slip and lack of continuity in the driving of gear 16. Since the actual connection of the driving arms with the gear 16 must necessarily be of limited area (as shown only two teeth of gear 38 can be engaged with gear 16 at any one time), it is necessary to provide teeth of substantial size in order to secure the necessary strength. This means fairly wide spacing of the teeth and the larger this spacing the greater the possibility of slip. But with the use of a locking means intermediate the driving arm and the actual driving portion thereof, such as the clutches described, very small teeth may be used since all may be simultaneously engaged and the use of a large number of small teeth will reduce the possibility of slip so that it is a negligible factor.

Another factor acting to reduce the slip is that an error in the alignment of the teeth of the mating clutch elements does not mean an equal error in the position of the driving arm. That is, if the clutch elements did not exactly mate up at the time when they are forced toward one another, the driving arm will push ahead, rolling the gear 38, until the clutch elements come into exact alignment and the axis of gear 38 will be moved a considerably less distance than its periphery, thus reducing the error. However, by providing a large number of fine teeth in the clutch elements, there is, as a practical matter, no danger of the teeth not coming into proper engagement at the proper time.

The invention has been disclosed herein, in an embodiment at present preferred, for illustrative purposes, but the scope of the invention is defined by the appended claims rather than by the foregoing description.

What I claim is,—

1. A variable speed transmission, comprising, driving and driven elements arranged face to face in adjacent relation, means to move said elements the one relatively to the other in a plane normal to their axes to vary the distance between such axes, and a series of devices each adapted to successively couple said elements, each of said devices including a part in constant non-slipping engagement with the driving element, a part in constant non-slipping engagement with the driven element, and means for periodically locking said parts together.

2. A variable speed transmission, comprising, driving and driven elements arranged face to face in adjacent relation, means to move said elements the one relatively to the other in a plane normal to their axes to vary the distance between such axes, and a series of devices each adapted to successively couple said elements for an operable driving engagement in either direction, each of said devices including a part in constant non-slipping engagement with the driving element, a part in constant non-slipping engagement with the driven element, and means for periodically locking said parts together.

3. A variable speed transmission, comprising, driving and driven elements arranged face to face in adjacent relation, means to move said elements the one relatively to the other in a plane normal to their axes to vary the distance between such axes, a series of driving members each pivoted near one end to one of said elements and spaced angularly one from another thereon, means on the other element for supporting the other end of each driving member, and means for successively rendering the last-named end of each driving member effective to drive the one element from the other for definite periods in the rotation thereof.

4. A variable speed transmission, comprising, driving and driven elements arranged face to face in adjacent relation, means to move said elements the one relatively to the other in a plane normal to their axes to vary the distance between such axes, a series of driving members each pivoted near one end to one of said elements and spaced angularly one from another thereon, means near the other element for supporting the other end of each driving member and maintaining it a constant radial distance from the last-named element, and means for successively rendering the last-named end of each member effective to drive the one element from the other for definite periods in the rotation thereof.

5. A variable speed transmission, comprising, driving and driven elements arranged face to face in adjacent relation, means to move said elements the one relatively to the other in a plane normal to their axes to vary the distance between such axes, a circular series of driving members angularly spaced about the periphery of one element and pivoted thereto near one end at a distance from the axis of such element, a series of supporting members each pivoted coincidentally with the axes of the other element and each pivotally connected near the other end with one of said members, and means for successively rendering the last-named end of each member effective to drive the second-named element for definite periods in the rotaion thereof.

6. A variable speed transmission, comprising, driving and driven elements arranged face to face in adjacent relation, means to move said elements the one relatively to the other in a plane normal to their axes to vary the distance between such axes, a series of driving members each pivoted near one end to one element and adapted to be periodically coupled at its other end to the other element, and means to effect the coupling of each driving member, including a part movable coincidentally with the axis of its pivot.

7. A variable speed transmission, comprising, driving and driven elements arranged face to face in adjacent relation, means to move said elements the one relatively to the other in a plane normal to their axes to vary the distance between such axes, a series of driving members each pivoted at one end to one of said elements at a distance from its axis, and means carried by the other end of each driving member for engaging the other element for an operable driving engagement in either direction.

8. A variable speed transmission, comprising, driving and driven elements arranged face to face in adjacent relation, means to move said elements the one relatively to the other in a plane normal to their axes to vary the distance between such axes, a series of driving members carried by one of said elements and adapted to be successively coupled to the other element to drive the latter, yieldable means for normally maintaining the members uncoupled, and positively operable means for periodically coupling said members and holding them coupled for predetermined intervals.

9. In a variable speed transmission, driving and driven elements arranged face to face in adjacent relation, one of said elements being a sun gear, a plurality of planetary gears in mesh with the sun gear, means connected with the other element for moving the planetary gears about the orbit of the sun gear, means for successively locking each planetary gear against rotation about its own axis, and means for moving the driving and driven members the one relatively to the other in a plane normal to their axes.

10. In a variable speed transmission, driving and driven elements arranged face to face in adjacent relation, one of said elements being a sun gear, a plurality of planetary gears in mesh with the sun gear, individual means for supporting the axis of each planetary gear at a constant radial distance from the axis of the sun gear, means connected with the other element for moving the planetary gears about the orbit of the sun gear, and means for successively locking each planetary gear against rotation about its own axis.

11. In a variable speed transmission, driving and driven elements arranged face to face in adjacent relation, one of said elements being a sun gear, a plurality of planetary gears in mesh with the sun gear, a plurality of arms each pivoted near one end to the other of said elements and spaced angularly one from another thereon, each of said arms carrying near its other end one of said planetary gears, means for holding the last-named end of each arm at a constant distance from the axis of the sun gear, a clutch element fixed on each of said means, a mating clutch element rotatable with each planetary gear and movable axially toward and away from the other element, and means for successively engaging each pair of clutch elements and holding them engaged for predetermined intervals.

12. In a variable speed transmission, driving and driven elements arranged face to face in adjacent relation, one of said elements being a sun gear, a plurality of planetary gears in mesh with the sun gear, a plurality of arms each pivoted near one end to the other of said elements and spaced angularly one from another thereon, each of said arms carrying near its other end one of said planetary gears, means for holding the last-named end of each arm at a constant distance from the axis of the sun gear, a clutch element fixed on each of said means, a mating clutch element rotatable with each planetary gear and movable axially toward and away from the other element, means for successively engaging each pair of clutch elements and holding them engaged for predetermined intervals, said last-named means including a lever pivoted to each of said arms and connected at one end with one of the movable clutch elements, a member extending through the pivot of each arm for connection at one end to the other end of the lever pivoted to such arm, a cam for successively engaging the other end of the last-named members and moving them in one direction, and yieldable means for moving such members in the opposite direction.

13. A variable speed transmission, comprising, driving and driven elements arranged face to face in adjacent relation, means to move said elements the one relatively to the other in a direction normal to their axes to vary the plane between such axes, a series of driving members pivoted at angularly spaced points to one of said elements at a distance from its axis, a series of carriers mounted on each side of the other element for swinging movement about the axis thereof, each series including one carrier for each of said members, means connecting each carrier of one series to one carrier of the other series so that the carriers are connected in pairs, each of said members being pivotally connected to one pair of carriers, and means mounted between each pair of carriers for connecting the member to the second-named element.

In testimony whereof I have affixed my signature.

ELLSWORTH FREY.